(12) United States Patent
Hill et al.

(10) Patent No.: US 9,739,645 B2
(45) Date of Patent: Aug. 22, 2017

(54) FIBRE OPTIC DISTRIBUTED SENSING

(75) Inventors: David John Hill, Dorchester (GB); Magnus McEwen-King, Hampshire (GB)

(73) Assignee: OPTASENSE HOLDINGS LIMITED (GB)

( * ) Notice: Subject to any disclaimer, the term of this patent is extended or adjusted under 35 U.S.C. 154(b) by 628 days.

(21) Appl. No.: 13/509,415

(22) PCT Filed: Nov. 11, 2010

(86) PCT No.: PCT/GB2010/002072
§ 371 (c)(1),
(2), (4) Date: May 11, 2012

(87) PCT Pub. No.: WO2011/058312
PCT Pub. Date: May 19, 2011

(65) Prior Publication Data
US 2012/0230629 A1 Sep. 13, 2012

(30) Foreign Application Priority Data

Nov. 13, 2009 (GB) .................................. 0919899.5

(51) Int. Cl.
G02B 6/00 (2006.01)
G02B 6/10 (2006.01)
(Continued)

(52) U.S. Cl.
CPC ..... G01D 5/35361 (2013.01); G01D 5/35348 (2013.01)

(58) Field of Classification Search
CPC ...... E21B 43/26; E21B 47/0006; E21B 47/01; G01D 5/353; G01D 5/35361; G01D 5/268;
(Continued)

(56) References Cited

U.S. PATENT DOCUMENTS

| 4,996,419 A | 2/1991 | Morey |
| 5,194,847 A | 3/1993 | Taylor et al. |

(Continued)

FOREIGN PATENT DOCUMENTS

| GB | 2442745 | 4/2008 |
| WO | WO 98/27406 | 6/1998 |

(Continued)

OTHER PUBLICATIONS

Unpublished U.S. Appl. No. 13/509,425, filed May 11, 2012 entitled: Optic Fibres and Fibre Optic Sensing.
(Continued)

*Primary Examiner* — Akm Enayet Ullah
*Assistant Examiner* — Michael Mooney
(74) *Attorney, Agent, or Firm* — McDonnell Boehnen Hulbert & Berghoff LLP

(57) ABSTRACT

A method of distributed fiber optic sensing is described in which an optical fiber (104) is interrogated with electromagnetic radiation; back-scattered radiation is detected; and the returns are processed to provide a measurement signal (310) for each of a plurality of longitudinal sensing portions of the optical fiber. The method comprises analyzing the measurement signals of a first subset of longitudinal sensing portions to provide a first zone (306a) having a first sensing function and analyzing the measurement signals of at least a second subset of longitudinal sensing portions to provide at least a second zone (306b) having a second, different, sensing function. The different sensing functions may include detecting different events of interest. In some embodiments the geometry of the fiber may provide different sensing zones (406a, 406b).

36 Claims, 3 Drawing Sheets

(51) Int. Cl.
  *G01J 1/04* (2006.01)
  *G01D 5/353* (2006.01)
(58) Field of Classification Search
  CPC ........ G01D 5/32; G01D 5/34; G01D 5/35348; G02B 6/00
  USPC ....... 385/12–13, 32; 356/32, 73.1, 448, 450, 356/477; 250/227.11, 227.14, 227.15, 250/227.18
  See application file for complete search history.

(56) References Cited

U.S. PATENT DOCUMENTS

| | | | |
|---|---|---|---|
| 6,380,534 B1 | 4/2002 | Farhadiroushan et al. | |
| 6,601,671 B1 | 8/2003 | Zhao et al. | |
| 6,913,079 B2 | 7/2005 | Tubel | |
| 6,937,151 B1 | 8/2005 | Tapanes | |
| 7,495,207 B2* | 2/2009 | Ogura | G01J 1/04 250/200 |
| 2006/0018586 A1 | 1/2006 | Kishida | |
| 2006/0028636 A1 | 2/2006 | Payton | |
| 2008/0068586 A1 | 3/2008 | Kishida et al. | |
| 2011/0088462 A1* | 4/2011 | Samson | E21B 47/10 73/152.18 |

FOREIGN PATENT DOCUMENTS

| | | | |
|---|---|---|---|
| WO | WO 02/057805 | 7/2002 | |
| WO | WO 2004/073172 | 8/2004 | |
| WO | WO 2009005256 | * 1/2009 | ......... G01M 11/319 |
| WO | WO 2010/020796 | 2/2010 | |

OTHER PUBLICATIONS

Preliminary Amendment filed on May 11, 2012 in U.S. Appl. No. 13/509,425.
Unpublished U.S. Appl. No. 13/509,402, filed May 11, 2012 entitled: Improvements in Distributed Fibre Optic Sensing.
Preliminary Amendment filed on May 11, 2012 in U.S. Appl. No. 13/509,402.
Unpublished U.S. Appl. No. 13/509,407, filed May 11, 2012 entitled: Improvements in Distributed Sensing.
Preliminary Amendment filed on May 11, 2012 in U.S. Appl. No. 13/509,407.
Blackmon et al., "Blue Rose Perimeter Defense and Security System", Proc. SPIE 6201, Sensors and Command, Control Communications and Intelligence (C31) Technologies for Homeland Security and Homeland Defense, May 10, 2006.
Jaaskelainen, "Fiber Optic Distributed Sensing Applications in Defense, Security and Energy", Proc. SPIE 7316, Fiber Optic Sensors and Applications VI, Apr. 27, 2009.

* cited by examiner

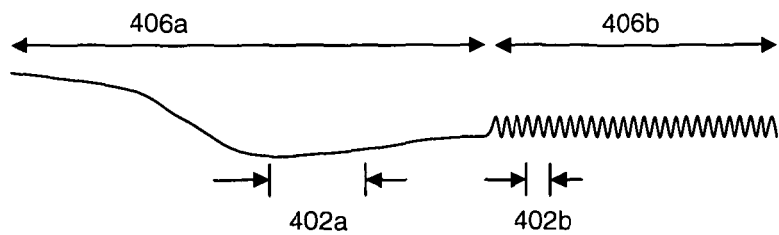
Figure 4
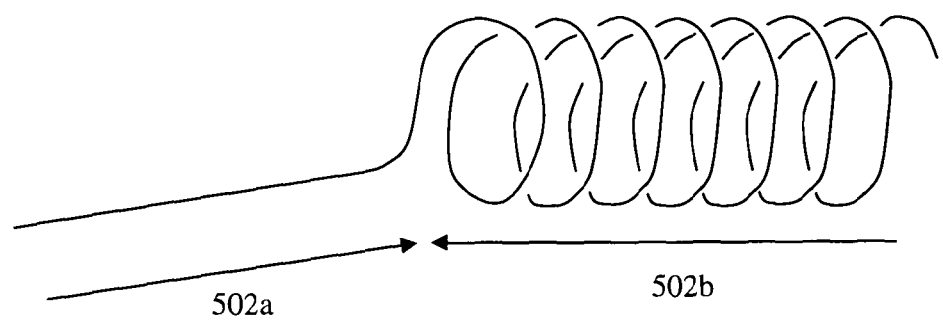
Fig. 5
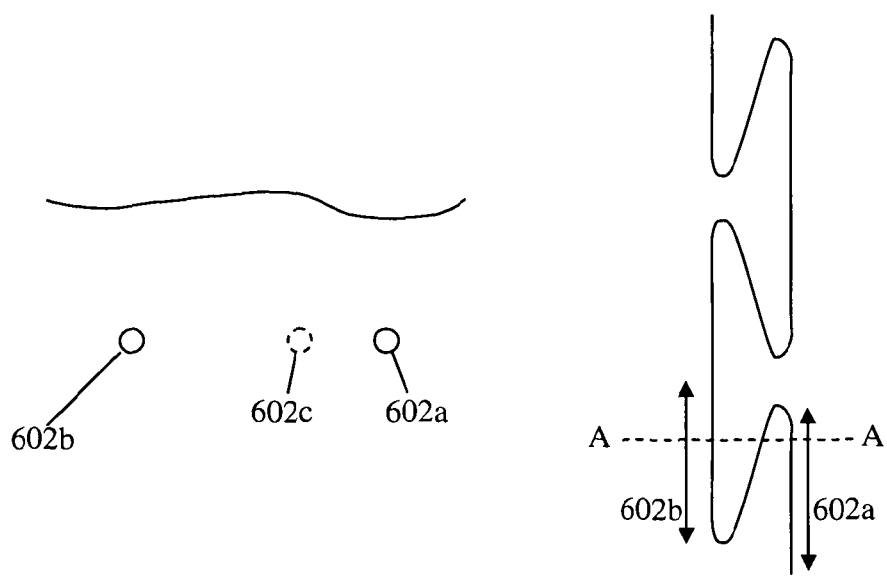
Fig. 6a
Fig. 6b

FIBRE OPTIC DISTRIBUTED SENSING

FIELD OF THE INVENTION

The present invention relates to fibre optic distributed sensing, and especially to fibre optic distributed acoustic sensing. In particular the invention relates to methods and apparatus for distributed acoustic sensing providing a plurality of independent sensing functions.

BACKGROUND OF THE INVENTION

Various sensors utilizing optical fibres are known. Many such sensors rely on fibre optic point sensors or discrete reflection sites such as fibre Bragg gratings or the like being arranged along the length of an optical fibre. The returns from the discrete point sensors or reflection sites can be analysed to provide an indication of the temperature, strain and/or vibration in the vicinity of the discrete sensors or reflection sites.

Such sensors using discrete reflection sites or fibre optic point sensors require the optical fibre including the sensor portions to be specially fabricated. Further the distribution of the sensors within the optical fibre is fixed.

Fully distributed fibre optic sensors are also known in which the intrinsic scattering from a continuous length of optical fibre is used. Such sensors allow use of standard fibre optic cable without deliberately introduced reflection sites such fibre Bragg gratings or the like. The entire optical fibre from which a backscatter signal can be detected can be used as part of the sensor. Time division techniques are typically used to divide the signal returns into a number of time bins, with the returns in each time bin corresponding to a different portion of the optical fibre. Such fibre optic sensors are referred to as distributed fibre optic sensors as the sensor options are fully distributed throughout the entire optical fibre. As used in this specification the term distributed fibre optic sensor will be taken to mean a sensor in which the optical fibre itself constitutes the sensor and which does not rely on the presence of specific point sensors or deliberately introduced reflection or interference sites, that is an intrinsic fibre optic sensor.

Various types of distributed fibre optic sensor or distributed acoustic sensor (DAS) are known and have been proposed for use in various applications.

U.S. Pat. No. 5,194,847 describes a distributed acoustic fibre optic sensor for intrusion sensing. A continuous optical fibre without any point sensors or specific reflection sites is used. Coherent light is launched into the optical fibre and any light which is Rayleigh backscattered within the optical fibre is detected and analysed. A change in the backscattered light in a time bin is indicative of an acoustic or pressure wave incident on the relevant portion of optical fibre. In this way acoustic disturbances any portion of the fibre can be detected.

GB patent application publication No. 2,442,745 describes a distributed acoustic fibre optic sensor system wherein acoustic vibrations are sensed by launching a plurality of groups of pulse modulated electromagnetic waves into a standard optical fibre. The frequency of one pulse within a group differs from the frequency of another pulse in the group. The Rayleigh backscattering of light from intrinsic reflection sites within the fibre is sampled and demodulated at the frequency difference between the pulses in a group.

U.S. Pat. No. 6,380,534 describes a distributed fibre optic strain and temperature sensing system which analyses the Brillouin back-scattering frequency distribution of light launched into the fibre to determine the temperature and strain along various portions of the sensing fibre, which may be embedded within a structure.

WO02/057805 describes the use of distributed fibre optic temperature, strain and/or acoustic sensors in a variety of applications including monitoring parameters of flow-lines in the oil and gas industry.

Distributed fibre optic sensing therefore provides useful and convenient sensing solutions that can monitor long lengths of optical fibre with good spatial resolution. For instance a distributed fibre optic acoustic sensor, as may be used for monitoring a pipeline, can be implemented with sensing portions 10 m long in up 40 km or more of optical fibre. Clearly this results in 4000 separate acoustic channels which would be very difficult for a human operator to monitor. Even with automated detection of signals above a threshold the amount of data may be overwhelming.

SUMMARY OF THE INVENTION

It is an object of the present invention to provide methods and apparatus for distributed fibre optic sensing which mitigate the above mentioned problem and/or increase the utility and/or flexibility of distributed fibre optic sensing systems.

Thus according to the present invention there is provided a method of distributed sensing comprising the steps of: interrogating an optical fibre with electromagnetic radiation; detecting electromagnetic radiation which is back-scattered from the optical fibre; processing said detected back-scattered radiation to provide a measurement signal for each of a plurality of longitudinal sensing portions of the optical fibre and analysing the measurement signals from the longitudinal sensing portions to detect events of interest wherein the method comprises analysing the measurement signals of a first subset of longitudinal sensing portions to provide a first zone having a first sensing function and analysing the measurement signals of at least a second subset of longitudinal sensing portions to provide at least a second zone having a second, different, sensing function.

The method of the present invention thus interrogates an optical fibre, detects back-scattered radiation and processes the detected radiation in analysis bins, to provide measurement signals corresponding to a plurality of longitudinal sensing portions of the fibre. The method also processes the measurement signals to detect events of interest, i.e. to detect measurement signals that are characteristic of the events of interest. The method of the present invention further identifies at least first and second subsets of the longitudinal sensing portions to provide respective first and second zones and analyses each subset to provide a different sensing function. In this way a single sensing fibre can be used to provide a plurality of different sensing functions at different parts of the fibre. This can improve the flexibility of the distributed fibre optic sensor, reduce false alarms and provide a more intelligible and meaningful output to an operator to monitor the sensor system, as will be explained in more detail later.

The different sensing functions may comprise detection of different events. Thus the measurement signals from the first zone may be analysed to detect a first event of interest whereas the signals from the second zone may be analysed to detect a second, different, event of interest.

Detecting an event of interest may comprise identifying a pre-determined characteristic of the event in the measurement signals from one or more longitudinal sensing portions of the optical fibre. For example a distributed fibre optic acoustic sensor may compare the measurement signals, i.e. the detected acoustic signals, from each longitudinal sensing portion, or groups of adjacent longitudinal sensing portions, with an acoustic signature of an event of interest. If the measured signal matches the acoustic signature of the particular event of interest this may be taken as a detection of the particular event of interest.

The method of the present invention may therefore involve analysing the measurement signals from the first zone to detect a first characteristic or signature and analysing the measurement signals from the second zone to detect a second characteristic or signature.

The method therefore allows one part of a sensing fibre to be used to detect a first event of interest and another part of the same sensing fibre to detect a second event of interest. By zoning the sensing fibre in this way the accuracy of detection may be improved and the amount of information generated is processed more efficiently to provide a more meaningful and concise output.

As an example suppose that a distributed acoustic fibre optic sensor is deployed along a perimeter or border, part of which is protected by a barrier such as a solid wall but part of which is completely open with no physical obstacles. The sensor comprises a single optical fibre deployed along both sections of the border. The sensor may be arranged with a first zone corresponding to the part of the optical fibre near the barrier and a second zone corresponding to the part of the optical fibre running along the open border. In the first zone the measurement signals may be monitored to detect acoustic events associated with sabotage or destruction of the barrier. The second zone may be monitored to detect movement of a land vehicle crossing or approaching the perimeter. Thus although both zones of the sensor may be performing acoustic sensing the first zone is monitored for different acoustic events to the second zone. Thus the method of the present invention provides the ability to perform different sensing functions at different parts of the fibre as may be appropriate for the particular environment.

Monitoring and processing of sensed data in this way can aid an operator and result in more effective and reliable monitoring of the system. When an event of interest is detected the method may comprise generating an alert, which could be one or more of a graphical alert on a display, an audible alarm, a visible alarm, sending of a message to a remote device, e.g. sending of an email or text message alert, etc. The operator of the system may therefore only respond to generated alerts.

In the example described above, suppose that part of the perimeter which is protected by the barrier is located near a road. Processing the measurement signals from the entire length of the optical fibre to detect land vehicles may lead to many detections from this part of the optical fibre. Consequently a large number of alerts may be generated, the majority of which will be false alarms. A large number of false alarms can consume a lot of time of an operator of the system and/or potentially mask the presence of a real alarm. The method of the present invention however allows each zone to be monitored only for events of interest that are relevant to that zone. Thus an alert is only generated for the relevant event of interest which eases the burden on an operator and increases the chance that the alert will be noted and acted upon.

It should be noted that subsets of longitudinal sensing portions of the optical fibre that comprise each of the zones do not necessarily have to comprise a set of contiguous sensing portions. Thus the first zone may comprise two or more groups of longitudinal sensing portions, with the sensing portions within each group being contiguous but the groups not being contiguous. For example, returning to the example described above, if the open section of perimeter is surrounded on both sides by walled sections of perimeter the second zone may correspond to that section of optical fibre which lies along the open part of the perimeter and the first zone may correspond to the remainder of the optical fibre. Thus the first zone could comprise the longitudinal sensing portions from the sections of optical fibre on either side of the open section. Alternatively the optical fibre could be arranged with a first zone corresponding to the first walled section of perimeter, a second zone corresponding to the longitudinal sensing portions of the fibre along the open part of the perimeter and a third zone corresponding to the other walled section of perimeter. The first and third zones may be monitored to provide the same sensing function—with the second zone providing a different sensing function. The method of the present invention may therefore comprise identifying more than two zones, each zone relating to a different subset of longitudinal sensing portions. There may be several different zones, each of which has a different sensing function although the measurement signals from at least two different zones may be analysed to provide the same sensing function.

The sensing functions may comprise detecting more than one event of interest. Providing different sensing functions in the first zone and second zone may therefore comprise detecting a first set of events of interest in the first zone and detecting a second set of events of interest in the second zone with the first set of events being different to the second set of events. The first and second sets may comprise mutually exclusive events of interest, but in some embodiments the first and second sets of events may comprise one or more common events of interest. Thus one or more common events of interest may be detected in both the first and second zones. The different sensing function is provided in the first and second zones by detecting at least one event of interest in one of the zones that is not detected in the other zone.

For example, returning again to the example discussed above, the first zone of the fibre corresponds to a walled section of perimeter and the set of events of interest may include destruction of the wall. The second zone of the fibre corresponds to an open part of the perimeter and the set of events to be detected includes land vehicles approaching or crossing the perimeter. In both zones however detecting an event of interest may include detecting a characteristic corresponding to the movement of people. Along the whole length of the perimeter it may be wished to monitor for an intruder on foot either having climbed the wall or crossed the open section of border.

Thus the same event of interest may be detected in more than one zone but the full set of events of interest vary between the first and second zones.

In some embodiments all the events of interest of the second zone may be common events of interest with the first zone but the first zone also detects at least one additional event of interest. In other words the sensing function of the second zone may comprise detecting any of a number of events of interest. All the same events of interest may also be detected in the first zone, but the first zone also detects at least one additional event of interest. Thus, returning the same example, it may actually be wished to detect vehicles approaching the walled section of perimeter corresponding to the first zone. Thus the sensing function of the first zone comprises detecting vehicles, people or destruction or damage to the wall. The section of border corresponding to the second zone has no wall and so there is no need to detect damage to the wall. Therefore the second sensing function comprises detecting land vehicles and people.

The set of events of interest of the first zone may thus comprise at least one event of interest that it not relevant for the second zone. However, as described above, it can be useful to avoid detecting certain events, which otherwise might be events of interest, in areas where a large number of false, or unnecessary, alarms may be generated.

The method may therefore comprise arranging the second zone to not detect at least one event of interest that is detected in the first zone.

For example consider a distributed fibre optic acoustic sensor deployed along the length of a buried pipeline and arranged to monitor for interference with the pipeline. Normally the whole length of the pipeline may be monitored to detect vehicles or people in the vicinity of the pipeline and any characteristics relating to digging or tunneling near the pipeline. However, in the event that some genuine ground works are being conducted near to the pipeline, but which do not cause a danger to the pipeline, it may be wished to stop detecting characteristics relating to digging or tunneling in that vicinity to avoid a constant alarm. Thus a subset of longitudinal sensing portions of the fibre in the vicinity of the ground works may be designated as a zone, say the second zone, with the remaining sensing portions of the fibre constituting the first zone. The detecting of digging or tunneling may be disabled in the second zone for the duration of the ground works. This avoids the presence of a constant alarm, which although a correct identification of digging near the pipeline, is known not to be a threat.

The method may therefore comprise selecting a subset of longitudinal sensing portions of the fibre of at least one of the zones. The selection may be performed by an operator via an interface and may be performed in a number of ways. Conveniently however at least one group of contiguous sensing portions of fibre is user defined, and the or each group allocated to a particular zone. Any portions of fibre not so defined or allocated may be automatically allocated to a default zone. An operator may select groups by selecting a portion of fibre on a graphical user interface including a representation of the fibre.

The method may also involve allocating a sensing function to at least one zone by selecting the events of interest which are to be detected in that zone. This may comprise deselecting certain events from a default list.

The groups of sensing portions selected by the operator may, in some instances overlap or a selected group may be a subset of prior selected group. For example a first group of sensing portions may be selected and allocated to a first set of events of interest. A second group of sensing portions may then be selected which at least partly overlaps with the first group, and allocated a second set of events of interest. If there are at least some areas of each group that don't overlap this defines three zones, a first zone corresponding to those sensing portions which belong to the first group only, a second zone corresponding to those sensing portions which belong to the second group only and a third zone corresponding to those sensing portions which belong to both groups. The first zone detects only the first set of events of interest, the second zone the second set of events of interest and the third zone detects events of interest from both sets.

The second group selected may be a subset of the first group leading to one of the zones effectively being a subzone of the other zone.

The arrangement of the zones and sensing function performed by each zone may be set by an operator. In some embodiments the sensing function and/or activation or deactivation of zones may be varied automatically based on a defined time interval. For instance, if a distributed fibre acoustic sensor is deployed along a pipeline to monitor for interference with the pipeline but planned maintenance is occurring along a stretch of the pipeline the relevant section of sensor may be set up as a zone which ignores digging activity. This zone may be given a fixed duration lifetime however based on the expected duration of the works after which it will automatically revert to sensing all events of interest. This may help prevent the existence of a zone from being overlooked with a loss of desired sensing function once the maintenance is completed. Additionally in some applications there may be expected acoustic disturbances at regular times. For example the acoustic disturbances expected during the day may vary to those expected at night and so different zones may be set to activate/deactivate at set times to provide different monitoring in the day as to at night.

It should be noted that whilst the method of the present invention may detect, i.e. identify and/or alert to an occurrence of an event of interest, the detection process may comprise the classification or categorization of the measurement signals according to the characteristics or signatures of events which are not of interest. For example there may be a set of possible events that may occur in a particular zone and the set of events of interest may be a subset of the set of possible events. The measurement signals from the relevant zone may be compared to the characteristics of all the possible events to determine whether the signals match any particular event. Signals which are a close match to the characteristic of a possible event can be classified as having being generated by that event. If the particular event is an event of interest the method detects that the event of interest has occurred and may generate an appropriate alert. If the event is not an event of interest then the signals may be ignored, although the classification may be recorded for future analysis.

For instance, as described above a zone may be arranged not to detect a particular event, such as digging or tunneling near a pipeline, because it is known that the event in question is occurring in the vicinity of that zone. In this situation however the measurement signals from the second zone may still be compared to the characteristics of the event in question, i.e. digging and tunneling. If the measurement signals are classified as representing digging or tunneling they can be safely ignored. By identifying the measurement signals as being generated by an event which is not of interest the chance of a false alarm being generated by those signals being mistaken for an event of interest, e.g. approach of a land vehicle, can be reduced.

The de-selection of an event of interest, i.e. setting a zone so that a particular event is not detected for that zone, represents a novel aspect of the invention. Also the use of characteristics of events which are not of interest in the analysis, so as to improve the detection of events that are of interest, represents another aspect of the present invention.

In some embodiments there may be some events that may occur in one zone which are not appropriate to another zone and thus the set of possible events for the zones may be different. For example if a perimeter includes a body of water a single fibre may be buried in a land part of the border and also deployed in the water A first zone may be established corresponding the parts of the fibre in land and a second zone may correspond to the part of the fibre in the water. The first zone may be arranged to detect land based intrusion and the second zone may monitor for water borne intrusions, e.g. detection of signals characteristic of outboard motors or the like. The fibre may be unconstrained within the water and thus it may be necessary to classify various measurement signals that would be expected due to movement of the fibre in the water as signals not of interest. At least some of these could potentially be similar to the characteristics of an event of interest for the land based portions of the fibre and thus in this situation events which are relevant for the second zone may not be at all relevant for the first zone.

The different sensing functions of the first and second zones may also comprise monitoring the signals from the zones for different purposes. For example, whilst the examples described above relate generally to detection of intruders or interference, distributed fibre optic sensors can also be used for condition monitoring. For example a fibre optic distributed acoustic sensor may be deployed along the length of a buried pipeline, such as an oil or gas pipeline. At least part of the fibre may be used to detect possible interference with the pipeline as described above. Thus detection of acoustic signals corresponding to the movement of people or vehicles in the vicinity of the pipeline, or especially associated with digging or tunneling, may comprise events of interest to be detected. The pipeline itself however may generate or propagate acoustic signals which may be used for condition monitoring. As described in co-pending patent application PCT/GB2009/002058 the acoustic signals generated, for instance by a pressure pulse moving along the pipeline or an object moving through the pipeline, may be used to give an indication of the condition of the pipeline. Thus the sensing function of at least one zone may comprise condition monitoring. The condition monitoring may comprise comparing the measurement signal from one or more longitudinal sensing portions with a previously acquired measurement signal to detect any significant change. The measurement signals used in condition monitoring may be acquired in response to a particular stimulus, e.g. a pressure pulse within a pipeline say, and/or may comprise the steady state measurement signals obtained in routine operation of the sensor The measurement signals used in condition monitoring may be integrated or averaged over a period of time or normalized in some way and/or they may be compared to appropriately averaged or normalized signals acquired previously.

Condition monitoring and detection of events of interest may be performed simultaneously in any given zone of the sensor. The measurement signals from the relevant zone may be analysed to detect a characteristic of an event of interest and may also be compared to at least one previously acquired signal to detect any significant changes. The ability to perform condition monitoring and detection of events of interest simultaneously represents another aspect of the present invention.

Of course, detection of an event of interest may be related to condition monitoring in that a sudden failure or rapid change in the condition of a structure being monitored may given rise to an associated characteristic signal which can be detected as an event of interest. For example, taking the example of pipeline monitoring, a significant sudden failure of the pipeline at a particular point, such as onset of a sudden leak, may generate a characteristic signal. This may be detected as an event of interest.

Other sensing functions may comprise tracking of objects, monitoring of operating parameters, seismic monitoring etc.

As described above the first and second zones correspond to first and second subsets of longitudinal sensing portions of the optical fibre and in some embodiments a zone may be defined by an operator in use by selecting any subset of longitudinal sensing portions. In one embodiment however the first subset of longitudinal sensing portions corresponds to portions of the optical fibre having a first physical arrangement and the second subset of longitudinal sensing portions corresponds to portions of the optical fibre having a second, different physical arrangement. In other words the first and second zones comprise to sections of the optical fibre having different physical arrangement, i.e. the optical fibre is deployed in a different way in the first zone to the second zone.

The different arrangement may comprise the geometry of the fibre. The geometry of the fibre in part determines the sensing function that the fibre can perform.

The geometry of the optical fibre may be arranged to provide a different effective spatial resolution in each zone. It will be understood that in a distributed fibre optic sensor which is interrogated by pulsed radiation, the spatial resolution of the longitudinal sensing portions of the fibre may typically depend on the duration of the interrogating pulse. For example in a distributed acoustic fibre optic sensor such as described in GB2,442,745 the spatial length of the longitudinal sensing portions is about 12 m. If the optical fibre is deployed such that the fibre is relatively straight, over lengths of a few tens of meters, it will be clear that the effective spatial resolution of the sensor will be the same as the spatial resolution of the longitudinal sensing portions, i.e. the 12 m long longitudinal sensing portions of optical fibre monitor the acoustic signals incident on a 12 m long stretch of the environment. The spatial resolution of the sensor may be varied by changing the interrogating radiation but this may have an effect on the length of fibre that may be monitored.

However, if the fibre geometry is such that the fibre is arranged in a curved or folded arrangement, for example having a helical or coiled path or a meandering path, the effective spatial resolution of the sensor may be reduced compared to the native spatial resolution of the fibre. For instance if the optical fibre is arranged such that a 12 m length of optical fibre is contained with a 1 m section of ground, although the length of the longitudinal portions of the fibre may be 12 m each such sensing portion only receives the acoustic signals incident over 1 m of the environment. Thus the effective spatial resolution of the sensor with regard to the environment would be 1 m.

Thus the geometry of the fibre in the first zone and the second zone may vary so as provide the sensor with a different effective spatial resolutions in each of the zones. For example in the first zone the optical fibre may be deployed in a generally straight or gently curving arrangement (on lengths scales of a few tens of meters) to provide a sensor wherein the spatial resolution of the sensor is equal to the spatial resolution of the longitudinal sensing portions of the fibre. In a second zone the fibre may be deployed in a coiled or folded type arrangement such that the effective spatial resolution of the sensor is shorter.

Therefore the different sensing functions in the first and second zones may comprise sensing with a different effective spatial resolution in the first and second zones. The optical fibre may therefore be deployed to have a particular geometry that various along the general path of the optical fibre so as to provide different zones having different effective spatial resolution. The arrangement of an optical fibre of a distributed fibre optic sensor so as to provide zones having different effective spatial resolution represents another aspect of the present invention.

Sections with a shorter effective spatial resolution may be interspersed, periodically or aperiodically, with sections of longer spatial resolution to provide a sensor that has a base spatial resolution along the length of the sensor but with sections of shorter spatial resolution disposed along the length of the sensor. Alternatively the optical fibre may be arranged to give a shorter spatial resolution at certain points where a better resolution is desired. In this way a balance between spatial sensitivity and overall length can be achieved. Clearly coiling or folding the optical fibre to shorten the effective spatial resolution of the sensor means that the length of whole sensor will be reduced (for a given length of optical fibre).

The geometry of the optical fibre may be determined when the optical fibre is installed by arranging the optical fibre in the desired geometry. The optical fibre is typically deployed within a fibre optic cable and thus the fibre optic cable may be installed in a coiled or folded arrangement. Alternatively, the optical fibre could be arranged within a fibre optic cable with a geometry which varies along the length of the cable, i.e. one section of cable could comprise a coiled optical fibre arrangement whereas another section comprises the optical fibre running straight along the cable. The cable itself may then be deployed a relatively straight path—although the cable itself may of course be further coiled or folded as required.

In some embodiments where the physical arrangement of the fibre provides a different effective spatial resolution, the measurement signals from the first subset of longitudinal sensing portions may be analysed in the same way as the measurement signals from the second subset. This may still provide a the first zone having a first sensing function at a first effective spatial resolution and a second zone having a second sensing function at a second effective spatial resolution. In some embodiments however the first and second subsets of longitudinal sensing portions may require or allow different analysis. The change in effective spatial resolution means that a characteristic which is detected in a signal longitudinal sensing portion at the longer spatial resolution is detectable in more than one adjacent longitudinal sensing portion at the shorter spatial resolution. Thus different characteristic of events of interest may be used in the different zones.

The geometry of the optical fibre may be additionally or alternative by arranged to provide additional sensing functions in at least one zone. For instance the optical fibre may be arranged in one zone so as to allow the direction of incidence of a disturbance of the optical fibre to be determined. As will be appreciated by the skilled person a disturbance, such as a propagating acoustic wave, may be detected by an appropriate distributed fibre optic sensor. However using a single optical fibre arranged along a relatively straight path it may not be possible to determine the direction of travel of the disturbance. Thus in one zone the fibre geometry may be arranged to allow the direction of incidence of the disturbance to be determined. The direction of incidence may be determined in one dimension, i.e. from which side of the sensor did the disturbance originate, in a two dimensional plane or in three dimensions depending on the arrangement of the fibre. The geometry of the fibre in one zone may be arranged such that magnitude or intensity of a disturbance may be resolved into its components in two or three dimensions.

The fibre geometry may also be such that the fibre coils back on itself so that different sections of the fibre which are non-adjacent or separated from one another along the length of the fibre nevertheless monitor substantially the same, or adjacent sections of the environment within which the fibre is deployed. For example consider a fibre optic distributed acoustic sensor used as a perimeter sensor. A long length of fibre, such as 40 km long, may be deployed in a coiled arrangement around a site perimeter. For instance the fibre may be deployed to form a first loop near an outer fence, a second loop within dead ground between the outer fence and a inner wall and in a third loop near the inner wall. A person walking directly from the outer fence to the inner wall may therefore cross three different sections of fibre. The method may therefore involve identifying different sections of the fibre as being linked zones so that a detection of a walking event in the zone corresponding to a detecting of a walking event in the linked zone corresponding to the dead ground is interpreted as a single detection. Linking the processing in this way may reduce false alarms and improve detection accuracy (for instance an alarm may be generated only if detected in both of two linked zones) but also allows information such as the speed and direction of movement of the acoustic source to be tracked.

The method of the present invention may be used with a variety of distributed fibre optic sensors but in a preferred embodiment the sensor is a distributed acoustic fibre optic sensor, i.e. a sensor in which the measurement signals correspond to the acoustic signals. By acoustic sensor, in the context of this patent application, is meant a sensor that can detect mechanical vibration of the fibre sensor or pressure waves incident on the fibre at relatively high frequencies. The distributed fibre optic acoustic sensor may detect and process Rayleigh backscattered radiation from the optical fibre as the measurement signals. The method may comprise interrogating the optical fibre with interrogating radiation and processing the detected backscattered radiation as described in GB2,442,745.

The step of analysing the measurement signals of the various zones to provide different sensing functions therefore preferably comprises using the same type of measurement signals in each zone, i.e. measurement signals which measure the same parameter. Thus for a distributed fibre optic acoustic sensor the measurement signals comprising the acoustic information, for instance Rayleigh backscattered radiation, is analysed in each zone. The method of the present invention therefore can provide different sensing functions in a fibre optic sensor which provides only acoustic (i.e. vibration) sensing.

Of course in fibre optic sensors which can provide different sensing for more than one parameter, e.g. strain and temperature, the method may comprise providing a first sensing function for one or more of the parameters in the first zone and a second sensing function for one or more of the parameters in the second zone.

Whilst the method has been described in terms of interrogating the fibre and processing the acquired data the data need not be processed at the location of the optical source and detector. The data could be transmitted to a remote location for processing.

Thus in another aspect of the invention there is provided a method of processing data from a distributed fibre optic sensor comprising the steps of: taking data corresponding to detected electromagnetic radiation which has been backscattered from an optical fibre; processing said data to provide a measurement signal for each of a plurality of longitudinal sensing portions of the optical fibre and analysing the measurement signals from the longitudinal sensing portions to detect events of interest wherein the method comprises analysing the measurement signals of a first subset of longitudinal sensing portions to provide a first zone having a first sensing function and analysing the measurement signals of at least a second subset of longitudinal sensing portions to provide at least a second zone having a second, different, sensing function.

This method of processing may utilise all of the embodiments described above with respect to the first aspect of the invention and also benefits from all of the same advantages.

The invention also relates to a distributed fibre optic sensor which has different zones which provide different sensing functions. Thus according to another aspect of the invention there is provided a distributed fibre optic sensor apparatus comprising: an optical fibre; a source of electromagnetic radiation configured to launch electromagnetic radiation into said fibre; a detector for detecting electromagnetic radiation back-scattered from said fibre; and a processor configured to: analyse the back-scattered radiation to determine a measurement signal for a plurality of discrete longitudinal sensing portions of the optic fibre; wherein the distributed fibre optic sensor comprises a first zone having a first sensing function, the first zone corresponding to a first subset of said longitudinal sensing portions and at least a second zone having a second, different, sensing function, the second zone corresponding to a second, different, subset of said longitudinal sensing portions.

The apparatus of this aspect of the invention provides all the same advantages and can be implemented in all the same embodiments as described above with reference to the other aspects of the invention.

In particular the processor may be configured to analyse the measurement signals of said first subset of longitudinal sensing portions to provide said first zone having a first sensing function and analyse the measurement signals of at least said second subset of longitudinal sensing portions to provide at least said second zone having a second, different, sensing function.

The different sensing functions may comprise the detection of different events of interest. As described above the different sensing functions may comprise detecting a first set of events of interest in the first zone and a second set of events of interest in the second zone. The first and set of events of interest may or may not have one or events of interest in common The first set of events of interest may be a subset of the second set of events of interest or vice versa.

The processor may be configured to classify the measurement signals based on whether they match one or more predetermined characteristics. The predetermined characteristics my comprise the characteristics of events of interest. The predetermined characteristics may also comprise the characteristics of other events, which are not events of interest. As described above in relation to the method by matching the measurement signals to the predetermined characteristics of likely events, including events not currently of interest, the sensor can correctly identify those signals generated by an event which is not of interest, and thus reduce false alarms.

The sensor apparatus preferably comprises a graphical display. The processor may be arranged to generate a graphical alert on the display when an event of interest is detected. The graphical alert may comprise an alert being displayed on a representation of the path of the optical fibre at the relevant part of the path. The graphical display may be co-located with the processor and/or a graphical display may comprise part of a control station for the sensor apparatus which is remote from the processor. The processor may therefore be configured to transmit data corresponding the measurement signals of the longitudinal sensing portions and/or the results of the analysis of said measurement signals to one or more remote devices. For instance the processor may generate one or more alert signals.

The method may involve generating different levels of alert and/or alarm. The level of alert may vary based on the type of detected event, the duration or the event, the intensity of the event, a determined range to the event and/or movement of the source of the event. For example a colour coded alert may be generated so that a green alert is simply an information alert to acknowledge a detection. An amber alert may warn of a possible threat and a red alert may warn of a threat that requires action. The higher levels of alert may involve audible alarms and/or generation of automated messages, e.g. to a response team.

Conveniently the apparatus is adapted such that a user can set one or more zones for the sensor apparatus in use. In one embodiment the apparatus is adapted such that a user can select a subset of longitudinal portions of the fibre by selecting a portion of the representation of the path of the optical fibre or a representation of the measurement channels of the optical fibre which is displayed on the graphical display. In other words the user may be able to set up zones of the sensor by selecting, for instance by positioning a selection window over a representation of the path of the optical fibre or a representation of the measurement channels of the sensor.

The graphical display may be configurable to display a set of events which may be detected and the apparatus may be adapted such that a user can select the events to be detected in a chosen zone.

The optical fibre may have a first physical arrangement in the first zone and a second physical arrangement, which is different to the first physical arrangement, in the second zone. The different physical arrangement in the first and second zones may comprise a different fibre geometry in each zone. The geometry in each zone may provide a different effective spatial resolution of the sensor in each zone as described above in relation to the method.

The geometry of the optical fibre may be additionally or alternative by arranged to provide additional sensing functions in at least one zone. As described above the optical fibre may be arranged in one zone so as to allow the direction of incidence of a disturbance of the optical fibre to be determined and/or such that magnitude or intensity of a disturbance may be resolved into its components in two or three dimensions.

The radiation source and detector will be located at one end of the optical fibre to launch radiation into the fibre and detect the radiation back-scattered from the optical fibre. The processor may be located with the source and the detector or it may be located remotely and it may receive the data from the detector. In some embodiments a processor may be located at with the source and detector to do some initial processing to put the data in a form suitable for transmission. Some processing may also be conducted on the data to reduce the amount of data to be transmitted. For instance the data could be processed to provide the measurement signals from each a plurality of longitudinal sensing portions prior to transmission.

In another aspect of the invention therefore there is provided a processor apparatus for taking data corresponding to a measurement signal of detected back-scattered radiation for each of a plurality of longitudinal sensing portions of an optical fibre and analysing the measurement signals from the longitudinal sensing portions to detect events of interest wherein the method comprises analysing the measurement signals of a first subset of longitudinal sensing portions to provide a first zone having a first sensing function and analysing the measurement signals of at least a second subset of longitudinal sensing portions to provide at least a second zone having a second, different, sensing function.

The processor may take data corresponding to the basic detected radiation which is back-scattered from the optical fibre and may therefore be configured to process said detected radiation to provide the measurement signal in each of said longitudinal sensing portions.

This aspect of the present invention offers all the same advantages and can be used in all the same embodiments as described above in relation to the other aspects of the invention.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein. A suitably programmed computer may control and optical source and receive data from a suitable optical detector. The computer program may be embodied in a transmission signal.

As described above different zones may, in some embodiments, be formed by the physical arrangement of the optical fibre. Thus in another aspect of the invention there is provided a distributed fibre optic sensor comprising an optical fibre having a first physical arrangement in a first zone to provide a first sensing function and a second, different, physical arrangement in a second zone to provide a second sensing function.

As described above the physical arrangement may comprise the geometry of the fibre. The optical fibre may be arranged to provide a first effective spatial resolution in the first zone and a second effective spatial resolution in the second zone. The optical fibre may be arranged in one zone so as to allow the direction of incidence of a disturbance of the optical fibre to be determined and/or such that magnitude or intensity of a disturbance may be resolved into its components in two or three dimensions.

In general the present invention relates to a distributed fibre optic sensor, especially to a distributed acoustic sensor, which performs multiple independent sensing functions using the same fibre. The independent sensing functions can detect different events for the same general purpose, e.g. detect different types of intrusion for an intrusion detection purposes, or may comprise sensing for different purposes, e.g. both intrusion detection and condition monitoring say can be performed simultaneously. Providing alerts/alarms for only the events of interest relevant to a particular part of the optical fibre can ease the burden on an operator and reduce the chance that genuine alarms will be missed. Being able to designate a zone where an alarm has been detected and effectively stop detection of that event, in the sense of generating an alarm, means that only genuine alarms will be presented to an operator.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which:

FIG. 4 illustrates a sensing fibre having different geometries in the different zones to provide different effective spatial resolution;

FIG. 5 shows an alternative geometry for providing a different spatial resolution;

FIGS. 6a and 6b shows sectional and plan views of a buried fibre in an alternative geometry.

DESCRIPTION OF THE INVENTION

Figure 1:
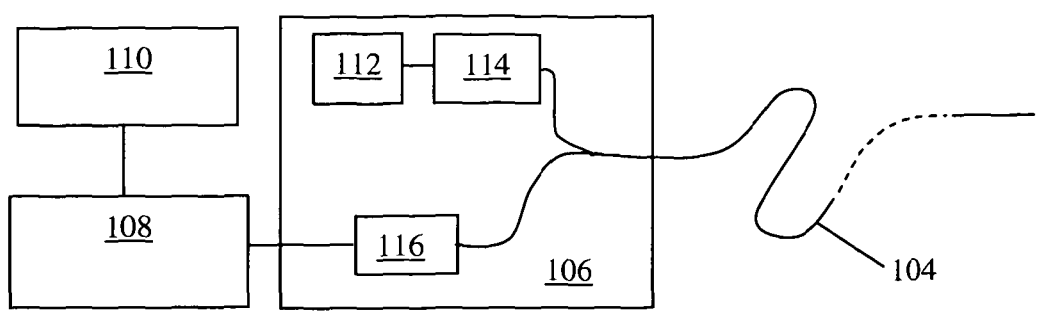
FIG. 1 illustrates the basic components of a distributed fibre optic sensor.

FIG. 1 shows a schematic of a distributed fibre optic sensing arrangement. A length of sensing fibre 104 is connected at one end to an interrogator 106. The output from interrogator 106 is passed to a signal processor 108, which may be co-located with the interrogator or may be remote therefrom, and optionally a user interface/graphical display 110, which in practice may be realised by an appropriately specified PC. The user interface may be co-located with the signal processor or may be remote therefrom.

The sensing fibre 104 can be many kilometers in length, and in this example is approximately 40 km long. The sensing fibre is a standard, unmodified single mode optic fibre such as is routinely used in telecommunications applications. In conventional applications of optical fibre distributed sensors the sensing fibre is at least partly contained within a medium which it is wished to monitor. For example, the fibre 104 may be buried in the ground to provide monitoring of a perimeter or monitoring of a buried asset such as a pipeline or the like.

The invention will be described in relation to a distributed acoustic sensor, although the skilled person will appreciate that the teaching may be generally applicable to any type of distributed fibre optic sensor.

In operation the interrogator 106 launches interrogating electromagnetic radiation, which may for example comprise a series of optical pulses having a selected frequency pattern, into the sensing fibre. The optical pulses may have a frequency pattern as described in GB patent publication GB2,442,745 the contents of which are hereby incorporated by reference thereto. As described in GB2,442,745 the phenomenon of Rayleigh backscattering results in some fraction of the light input into the fibre being reflected back to the interrogator, where it is detected to provide an output signal which is representative of acoustic disturbances in the vicinity of the fibre. The interrogator therefore conveniently comprises at least one laser 112 and at least one optical modulator 114 for producing a plurality of optical pulse separated by a known optical frequency difference. The interrogator also comprises at least one photodetector 116 arranged to detect radiation which is backscattered from the intrinsic scattering sites within the fibre 104.

The signal from the photodetector is processed by signal processor 108. The signal processor conveniently demodulates the returned signal based on the frequency difference between the optical pulses such as described in GB2,442, 745. The signal processor may also apply a phase unwrap algorithm as described in GB2,442,745.

The form of the optical input and the method of detection allow a single continuous fibre to be spatially resolved into discrete longitudinal sensing portions. That is, the acoustic signal sensed at one sensing portion can be provided substantially independently of the sensed signal at an adjacent portion. The spatial resolution of the sensing portions of optical fibre may, for example, be approximately 10 m, which for a 40 km length of fibre results in the output of the interrogator taking the form of 4000 independent data channels.

In this way, the single sensing fibre can provide sensed data which is analogous to a multiplexed array of adjacent independent sensors, arranged in a linear path.

Figure 2:
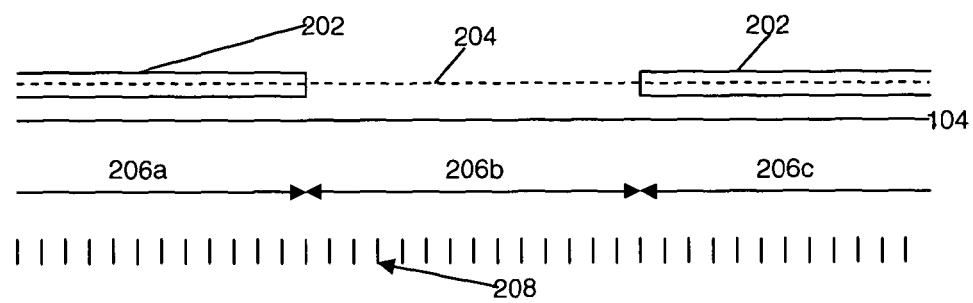
FIG. 2 illustrates part of a path of a sensing fibre buried in the ground along part of a border and the discrete sensing portions of fibre.

FIG. 2 illustrates part of the sensing fibre arranged along the path of a perimeter or border 204. As shown in FIG. 2 the sensing fibre may be arranged in a generally straight path along the line of the border 204. Divisions 208 represent the spacing of the longitudinal sensing portions of the fibre (not to any particular scale).

In one embodiment different subsets of the longitudinal sensing portions of the fibre are arranged to provide different zones with different sensing functions. The zones thus correspond to sections of the sensing fibre and the sensing function may be chosen to match the sensing function required at that part of the sensing fibre.

For example as shown in FIG. 2 the sensing fibre is deployed just within the perimeter with a path that it locally parallel to the perimeter. Part of the perimeter 204 is protected by a wall 202, however another part of the perimeter is open with no barrier to passage across the perimeter or at least no barrier that would represent a significant impediment to crossing the perimeter. At the open section of perimeter it may therefore be desired to detect movement of land vehicles and/or people in the vicinity of the perimeter.

At the section of perimeter which is protected by the wall 202 the detection of a land vehicle near to the perimeter may be interest as it could indicate suspicious activities. However it may be assumed that no land vehicle can cross the perimeter at this point without demolishing the wall. If part of this section of the perimeter is located near a public road say the detection of land vehicles may lead to several false positives being generated.

Thus in one embodiment of the present invention the subset of longitudinal sensing portions corresponding to the section of sensing fibre deployed along the open stretch of perimeter is designated as one zone. This is illustrated in FIG. 2 as section 206b.

The signals from zone 206b are therefore analysed to detect any vehicles approaching or crossing the sensing fibre and also detecting any people walking near or crossing the sensing fibre.

This can be achieved by monitoring the acoustic signals from the relevant sensing portions of the sensing fibre for acoustic signals which are characteristic of the movement of vehicles or personnel in the vicinity of the fibre. As the skilled person will be aware acoustic signatures analysis may be performed to detect acoustic signatures which are representative of land vehicles, or various types of land vehicles and also acoustic signatures which are representative of the movement of people on foot. The acoustic signature analysis may comprise analysing the evolution of the signal from a longitudinal sensing portion of the fibre against a known signature. In some embodiments the signals from more than one adjacent sensing portion of fibre may be analysed together to detect a particular characteristic.

The signals from the longitudinal sections of fibre corresponding to the walled section of perimeter on either side of the open part, i.e. subsets 206a and 206c comprise another zone. It will therefore be appreciated that a zone of the fibre can comprise multiple non-contiguous sections of the fibre and that one zone can, in effect, be a subzone of another zone. In practice however it may be easier to analyse the signals from section 206a as one zone and the signals from section 206c as another zone but to apply the same sensing function to each of these zones.

The signals from sections 206a and 206c may therefore be analysed to detect damage to the wall 202, for instance acoustic signals characteristic of hammering, drilling or battering of the wall using acoustic signature analysis. In addition the signals could be monitored for particularly intense signals which could be indicative of a collision with the wall or an explosion at the wall.

The signals from the zone(s) corresponding to sections 206a and 206c of the sensing fibre may therefore be analysed to detect events of interest, i.e. acoustic signals which match the predetermined characteristics of events which it is wished to detect, and the signals from section 206b may be analysed to detect different events of interest.

However it may also be wished to detect movement of people in the walled section of perimeter to detect people who have scaled the wall. Thus the signals from section 206a and 206c may also be analysed to detect acoustic signals characteristic of movement of people using the same signature analysis for people detection as is used in section 206b.

The sensing fibre can thus be divided into a plurality of different zones and only those events which are relevant for the particular section of fibre may be detected.

Figure 3:
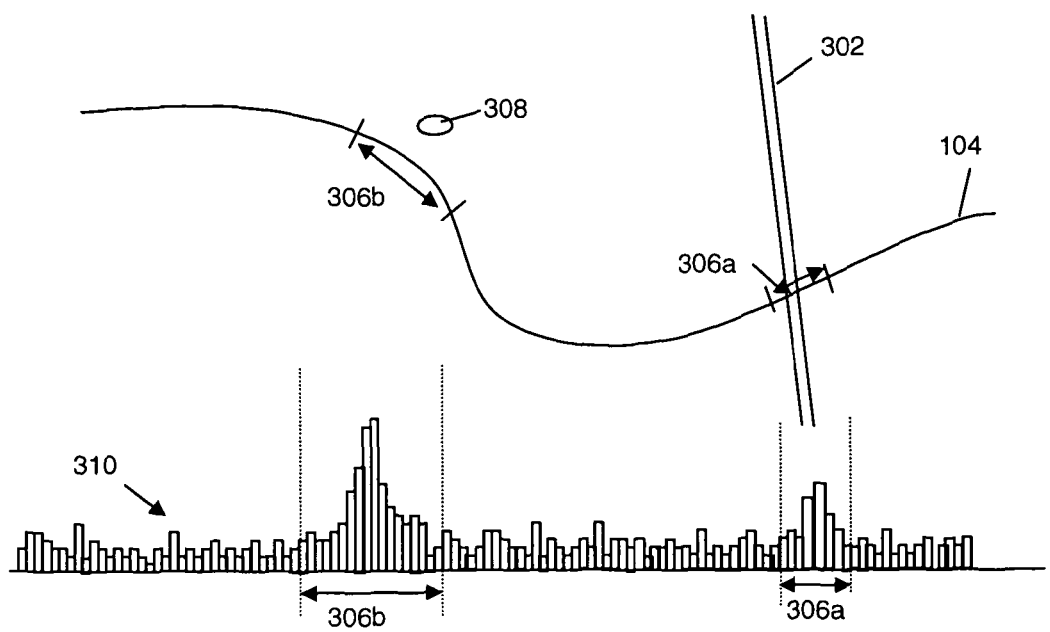
FIG. 3 illustrates part of a path of a sensing fibre buried in the ground alongside a pipeline

As another example FIG. 3 illustrates part of the path of a sensing fibre 104 which is buried alongside a buried pipeline, such as an oil and gas pipeline. The sensing fibre may be used to monitor for possible interference with the pipeline. Thus the sensing fibre may be monitored to detect the acoustic characteristics associated with digging or tunneling near to the pipeline. Additionally the signals may be monitored to detect the characteristics associated with the movement of people and/or vehicles near to the pipeline as, in unpopulated areas the movement of people or vehicles near to the pipeline may be indicative of potential interference. However a road 302 crosses the pipeline at one part of its length. Thus vehicular movement is expect in the vicinity of the road and detecting the movement of vehicles at this part of the pipeline may generate numerous false alarms. In one embodiment of the present invention therefore a section of the sensing fibre at the location of the road is designated as a separate zone 306a. Within this zone 306a the presence or movement of vehicles is not detected as an event of interest. The signals from the longitudinal sensing portions of fibre within this zone are not analysed to detect vehicles. These signals are analysed to detect any characteristics signals indicative of digging or tunneling in the vicinity of the pipeline.

The signals from longitudinal sensing portions of section 306a may still be analysed using acoustic signature analysis which includes the acoustic signature of land vehicles in order to correctly classify any signals. In other words if acoustic signals are detected which are a good match to the acoustic signature of a moving vehicle, the signals may be classified as such and ignored. In this way all the measurement signals may be identified where possible and the identification used in the detection of events of interest. By identifying the signals are being generated by an event not of interest for that zone, false detections can be avoided.

In operation therefore the backscattered radiation from the sensing fibre may be processed to provide measurement signals from each longitudinal sensing portion of fibre. Representative histogram 310 illustrates the type of data that may be collected and shows the average intensity of acoustic disturbance measured by each longitudinal sensing portion of a short period of time. The x-axis represents the distance along the fibre. The change in intensity over time may be automatically analysed to detect event of interest as described above.

If an event of interest is detected an alarm or alert may be generated. For example an audible and/or visible alert may be generated at one or control stations. The visible alert may output the nature of the identified event and the location of the detected event along the fibre. In one embodiment an alert icon, which may be relevant to the detected event, is displayed at the correct location on a map of the pipeline/fibre.

For example consider that the default sensing function of all sections of the fibre is to detect digging or tunneling near to the pipeline as a critical event and also to detect the presence of vehicles or people near to the pipeline. The section of fibre 306a near the road has been arranged as a separate zone however where the detection of vehicles is disabled to avoid false alarms.

Suppose that some digging starts at location 308. This will cause acoustic vibrations to pass through the ground, which will cause vibration of the sensing fibre in the vicinity of the digging. These vibrations will increase the intensity of the acoustic disturbances measured at that part of the fibre, as illustrated in histogram 310. The signals from this part of the fibre are analysed using acoustic signature analysis and the signals are identified as matching characteristic associated with mechanical digging. At this point the processor communicates with the control station and an alarm is generated. An audible alarm is sounded to get the attention of the operator and details of the nature of the alarm are displayed on the graphical display. This includes an identification of the type of event of interest, i.e. digging, and the detected position. An automatic alert may also be sent to a patrol unit. The operator may check to see if any ground works are scheduled in that location and/or more send a patrol to investigate.

If the digging turns out to be benign, i.e. the diggers have the appropriate permissions, are digging a safe distance from the pipeline and/or know the location of the pipeline the work may be allowed to continue. At this point it may be wished to remove the alarm from that section of the pipeline to avoid unnecessary alarms from potentially masking the presence of a new genuine alarm.

The operator may therefore select a portion of fibre 306b surrounding the detected event and designate it as another zone. Once zone 306b has been established the operator may select the events of interest to be detected and may de-select the detection of digging within that zone. The duration of the zone may be time limited. For instance the zone may only last for the expected duration of the works. Further the zone may be arranged to apply during daylight working hours only, depending on the nature of the works being carried out. Thus the zone may persist during normal working hours. Once evening arrives zone 306b ceases to be a separate zone and the default sensing function is reapplied. At the start of the next day however the zone 306b with the designated sensing function will be automatically re-applied.

The zones may therefore be designated by an operator via a user interface. A user may be presented with a graphical indication of the sensing portions of the fibre sensor and may be able to select any group or groups of sensing portions to designate as a zone. The operator may then be able to select or deselect events of interest from a master list that apply to the selected group(s) of sensing portions.

In another embodiment however a zone may be created by the arrangement of the sensing fibre within that zone.

FIG. 4 illustrates a sensing fibre 104 which is arranged in a first zone 406a having a first geometry and a second zone 406b having a second geometry. In the first zone the fibre is laid out fully extended in a generally straight or gently curving path, at least compared to the length scale of the longitudinal sensing potions. FIG. 4 represents the length 402a of fibre which corresponds to a single longitudinal sensing portion of fibre.

The length of the longitudinal sensing portions is determined by the characteristics of the interrogating radiation and the processing but in general the smallest length of fibre which can resolved as an independent sensing portion is related to the duration of the interrogating pulse. Thus a longer pulse results in a longer length of sensing portion and a shorter duration pulse results in a shorter length of sensing portion. The duration of the interrogating pulse also has an effect on the overall range of the system, i.e. the length of continuous fibre which can be interrogated. As the skilled person will appreciate the range depends on how much light is transmitted into the fibre. For a Rayleigh back-scattering distributed acoustic sensor however the interrogating pulse should be below the non-linear threshold for the optical fibre. Thus puts a limit on the maximum instantaneous intensity that can be transmitted into the optical fibre. Thus to achieve a certain range, a certain duration of pulse is required which effectively sets the minimum spatial length of fibre that can be separately resolved. As an example a 40 km length of optical fibre can be monitored with a spatial length of the sensing portions of 10 m.

The embodiment shown in FIG. 4 varies the effective spatial resolution of the sensor in the two zones by variation of the geometry of the fibre. As mentioned above in the first zone the fibre is laid out fully extended. Thus the effective spatial resolution of the sensor is the same as the spatial resolution of the longitudinal sensing portions. In the second zone however the optical fibre has a generally extending axis but has a meandering path with respect to such axis such that each 1 m along the axis comprises significant more than 1 m in length of optical fibre. FIG. 4 illustrates the length 402b along the axis corresponding to a section of fibre equal to the length of a longitudinal sensing portion. It will therefore be clear that each individual sensing portion of fibre in the second zone receives acoustic signals from a much shorter length of the environment than those in the first zone. The effective spatial resolution of sensor is therefore shortened, i.e. the sensor as a whole can be seen as having sensing portions which extend along the axis of the sensor and which are shorter in length than the discrete sensing portions of the fibre.

The meander could be achieved when the sensing fibre is installed. As the skilled person will appreciate the sensing optical fibre, comprising a core and cladding, may comprise a fibre optic cable with a protective jacket. The cable may comprise one or more optical fibres. The cable itself may be arranged in a desired meandering path about a general axis when deployed. Depending on the maximum degree of curvature which is acceptable for the particular optical fibre or cable various different degrees of meander could be used. For example, a meander with a transverse amplitude of about 50 cm and a pitch of about 10 cm would mean that 10 m of optical fibre would extend about 1 m along the sensor path.

Other arrangements are possible however. For instance the optical fibre in at least one zone may have a coiled or helical type geometry. FIG. 5 shows a first section 502a in which the fibre is fully extended and a second section 502b where the fibre is coiled in a helical structure about the axis of the sensor. Coiling of the fibre could allow a relatively long length of fibre to be arranged over a short spatial length without a large transverse extent. For example, as compared to the meandering path, a helix with a diameter of just over 30 cm and a pitch of 10 cm could compress 10 m of fibre within 1 m of the sensor length. Even tighter coils may allow the coil to be part of the cable itself. For instance a fibre could be coiled with a 5 cm diameter and a 1.5 cam pitch within a cable. In this instance 10 m of optical fibre would be arranged with 1 m of cable. The cable could be easily deployed along the desired path of the sensor as any other type of cable and no special arrangement would be needed in the installation of the cable.

Clearly however the arrangement of the optical fibre for use as a sensing fibre in a distributed acoustic sensor must not constrain the ability of the fibre to react to acoustic waves and vibrations. The skilled person would readily understand how the cable could be deployed and/or could easily test the response of the fibre in possible geometries.

The arrangement of the optical fibre may also be such to provide additional sensor functionality, such as the ability to determine the direction of incidence of an incoming acoustic wave in one or more dimensions.

FIGS. 6a and 6b shows one example where the optical fibre is arranged so as to have two parallel sensing portions separated along the horizontal direction so as to allow the determination of the direction of incidence of an acoustic wave. FIG. 6a shows a plan view of the cable arrangement and FIG. 6b shows a sectional view along line A-A. The cable has a Z shape arrangement with a first straight section 602a which extends for at least the length of a longitudinal sensing portion in a first direction parallel to a second straight section 602c which is also at least the length of a longitudinal sensing portion. These two parallel sections are spaced a short distance apart and wholly or partly overlap in the first direction. Connecting the two sections is an angled section 602c.

By using the acoustic signals received at section 602a and the acoustic signals received at section 602b the direction of incidence of the acoustic signals (perpendicular to the sections 602a and 602b) can be determined by identifying a response due to the same acoustic impulse in both sections of fibre and looking at the relative times of arrival of the signal at that part of the fibre. Section 206c of fibre may be used as a sensing portion or the returns from this section of fibre may be ignored.

Other geometries could be used to allow the direction of incidence to be determined. A geometry having three parallel sensing portions spaced apart in two dimensions would enable the point of origin in a plane perpendicular to the sensing portions to be determined.

Referring back to FIG. 3 embodiments of the present invention also allows for sensing for different purposes. As described above a sensing fibre deployed along the length of the pipeline may be used to detect potential interference with the pipeline. At the same time however the fibre may also be used for monitoring the condition of the pipeline itself. Co-pending patent application PCT/GB2009/002058, the contents of which are hereby incorporated by reference thereto, describes how a distributed acoustic fibre can be used to monitor the condition of the conduit such as a pipeline by acoustically exciting the pipeline and recording the response from each sensing portion of the fibre. This response can be compared to a previous baseline response to detect any significant changes. Significant changes along the length of the pipeline could be indicative of decay of the pipeline or the build up of deposits in the flow line. The pipeline may be excited by a device which generates acoustic waves and/or a signal of opportunity, such as caused by passage of a pig through the pipeline, could be used. Alternatively the response of the sections of sensing fibre along the length of the pipeline could be monitored based on the ambient acoustic noise and compared with previously acquired reference signals to detect any significant change.

In some embodiments condition monitoring may only be appropriate along part of the length of the sensing fibre and thus the sensor may be divided into a zone where condition monitoring is performed and another zone where condition monitoring is not relevant.

When events of interest for the relevant zone are detected an alarm or alert may be generated. There may be different types of alert for different types or severity of detected events and the alerts may be graded in terms of severity. For example, consider a pipeline monitoring application in which the sensor is adapted to provide condition monitoring and also detection of interference. Detection of an acoustic signature corresponding to people walking near the pipeline may be of interest but not too significant on its own. Thus detection of personnel may generate a low level alert, for instance a warning icon may appear on a graphical indication of the relevant section of pipeline. This type of warning may be colour coded and may for instance be green to indicate a detection only. Detecting a signal that is indicative of a vehicle in a section where a vehicle is not expected may be more severe however as this may be more indicative of potential interference. Thus such a detection and may lead to a higher alert status, for instance an amber coloured warning possibly accompanied with an audible alert. Detection of a signature corresponding to digging may generate a high status alert, although in this instance the status of the alert may depend on the duration and intensity (or if appropriate detected range) of the event. If the signal only lasts for a very short period of time or is low intensity it may not be a concern and may just be flagged as a detection. However a prolonged, intense signal may generate a full alert which may involve sounding an audible warning and generating an automated message to a response unit.

Figure 7:
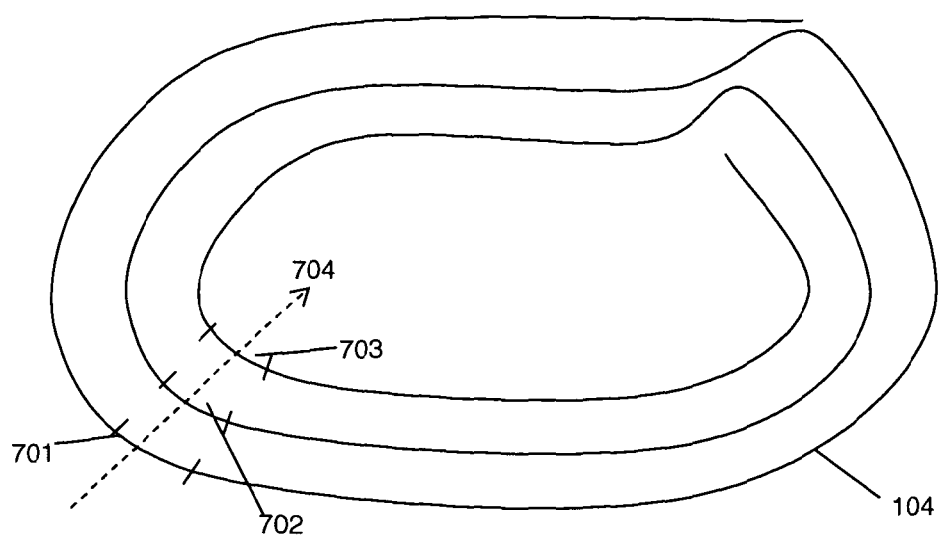
FIG. 7 illustrates that different zones of the fibre may be linked by deployment of the fibre.

The geometry of the fibre may also be such that different zones of the fibre may be linked. For example FIG. 7 illustrates a single fibre 104 deployed to provide different layers of perimeter monitoring. The fibre 104 is deployed with three loops. For example an outer loop may be arranged outside of a perimeter fence for instance to provide for detection of personnel or vehicles. An middle loop may be provide adjacent a perimeter fence or the like to detect damage to the fence and an inner loop may be provided within the perimeter fence to detect movement within the perimeter. Thus each loop of the fibre may be designated as a separate zone having slightly different sensing functions. In all instances however it may be wished to detect movement of people. In this case the fact that different sections of the fibre are arranged nearby the same section of the perimeter can be used to provided increased functionality. For instance, the sensing portions of fibre of the outer loop which form the group 701 may be linked with the sensing portions of fibre 702 of the middle loop which correspond to the same section of perimeter and likewise the those portions 703 of the inner loop that correspond to the same section of perimeter. If the same type of acoustic event is detected in the linked zones in sequence these individual detections may be categorized as belonging to a single event. For instance a person approaching along path 704 will be successively detected by zones 701, 702 and then 703. By comparing the detected signals from these zones the individual detections from the three linked zones may be identified as belonging to the same event. This may enable, for instance, the speed and direction of movement to be tracked but also clarifies that the source of the disturbance within the perimeter detected by zone 703 originally started outside the perimeter and has somehow bypassed the perimeter fence.

It will be understood that the present invention has been described above purely by way of example, and modification of detail can be made within the scope of the invention For example a single processor or other unit may fulfil the functions of several units or sub-units recited in the claims.

It will also be noted that each feature disclosed in the description, and (where appropriate) the claims and drawings may be provided independently or in any appropriate combination.

The invention claimed is:

1. A method of distributed sensing comprising the steps of:
   interrogating an optical fiber with electromagnetic radiation;
   detecting electromagnetic radiation which is back-scattered from the optical fiber;
   processing said detected back-scattered radiation to provide a measurement signal for each of a plurality of longitudinal sensing portions of the optical fiber; and
   analysing the measurement signals from the longitudinal sensing portions to detect events of interest, wherein the method comprises
   analysing the measurement signals of a first subset of longitudinal sensing portions to provide a first zone having a first sensing function and analysing the measurement signals of at least a second subset of longitudinal sensing portions to provide at least a second zone having a second, different, sensing function, wherein the measurement signals from the first zone are analysed to determine if the measurement signals match a first characteristic or signature of a first event of interest and the measurement signals from the second zone are analyzed to determine if the measurement signals match a second characteristic or signature of a second, different, event of interest.

2. A method as claimed in claim 1 wherein at least one of the first zone or second zone comprises two or more groups of longitudinal sensing portions, wherein the sensing portions within each said group are contiguous but the groups are not contiguous.

3. A method as claimed in claim 1 comprising identifying more than two zones, each zone relating to a different subset of longitudinal sensing portions.

4. A method as claimed in claim 1 wherein providing different sensing functions in the first zone and second zone comprises detecting a first set of events of interest in the first zone and detecting a second set of events of interest in the second zone, with the first set of events being different to the second set of events.

5. A method as claimed in claim 4 wherein the first and second sets of events comprise one or more common events of interest.

6. A method as claimed in any of claim 1 wherein the different sensing function is provided in the first and second zones by detecting at least one event of interest in one of the zones that is not detected in the other zone.

7. A method as claimed in any of claim 1 wherein the analysis of measurement signals from second zone is arranged not to detect at least one event of interest that is detected in the analysis of the measurement signals from the first zone.

8. A method as claimed in claim 1 comprising the step of selecting a subset of longitudinal sensing portions of the fiber to form at least one of the zones.

9. A method as claimed in claim 8 wherein the step of selecting a subset of longitudinal sensing portions comprises selecting a portion of fiber on a graphical display showing a representation of the fiber.

10. A method as claimed in claim 1 comprising the step of allocating a sensing function to at least one zone by selecting the events of interest which are to be detected in that zone.

11. A method as claimed in claim 1 wherein the step of analysing said measurement signals comprises classifying and/or categorizing the measurement signals according to the characteristics of events which are not of interest.

12. A method as claimed in claim 1 wherein the different sensing functions comprise analysing the signals from the zones for different purposes.

13. A method as claimed in claim 1 wherein the sensing function of at least one zone comprises condition monitoring.

14. A method as claimed in claim 13 where condition monitoring comprise comparing the measurement signals from one or more longitudinal sensing portions with a previously acquired measurement signal to detect any significant change.

15. A method as claimed in claim 1 wherein the first subset of longitudinal sensing portions corresponds to portions of the optical fiber having a first physical arrangement and the second subset of longitudinal sensing portions corresponds to portions of the optical fiber having a second, different physical arrangement.

16. A method as claimed in claim 15 wherein the first physical arrangement comprises a first geometry of the fiber and the second physical arrangement comprises a second geometry of the fiber.

17. A method as claimed in claim 16 wherein the first geometry provides a first effective spatial resolution in the first zone and the second geometry provides a second different effective spatial resolution in the second zone.

18. A method as claimed in claim 16 wherein one of the first or second geometry comprises a generally straight or gently curving arrangement and the other of the first or second geometry comprises a coiled or folded type arrangement.

19. A method as claimed in claim 1 wherein the different sensing functions in the first and second zones comprise sensing with a different effective spatial resolution in the first and second zones.

20. A method as claimed in claim 1 comprising a method of distributed acoustic sensing.

21. A method of processing data from a distributed fiber optic sensor comprising the steps of:
   taking data corresponding to detected electromagnetic radiation which has been back-scattered from an optical fiber;
   processing said data to provide a measurement signal for each of a plurality of longitudinal sensing portions of the optical fiber; and
   analysing the measurement signals from the longitudinal sensing portions to detect events of interest, wherein the method comprises
   analysing the measurement signals of a first subset of longitudinal sensing portions to provide a first zone having a first sensing function and analysing the measurement signals of at least a second subset of longitudinal sensing portions to provide at least a second zone having a second, different, sensing function, wherein the measurement signals from the first zone are analysed to determine if the measurement signals match a first characteristic or signature of a first event of interest and the measurement signals from the second zone are analyzed to determine if the measurement signals match a second characteristic or signature of a second, different, event of interest.

22. A distributed fiber optic sensor apparatus comprising:
   an optical fiber;
   a source of electromagnetic radiation configured to launch electromagnetic radiation into said fiber;
   a detector for detecting electromagnetic radiation back-scattered from said fiber; and
   a processor configured to:
      analyse the back-scattered radiation to determine a measurement signal for a plurality of discrete longitudinal sensing portions of the optic fiber; wherein the distributed fiber optic sensor comprises a first zone having a first sensing function, the first zone corresponding to a first subset of said longitudinal sensing portions and at least a second zone having a second, different, sensing function, the second zone corresponding to a second, different, subset of said longitudinal sensing portions, wherein the measurement signals from the first zone are analysed to determine if the measurement signals match a first characteristic or signature of a first event of interest and the measurement signals from the second zone are analyzed to determine if the measurement signals match a second characteristic or signature of a second, different, event of interest.

23. A distributed fiber optic sensor apparatus as claimed in claim 22 wherein the processor is configured to analyse the measurement signals of said first subset of longitudinal sensing portions to provide said first zone having a first sensing function and analyse the measurement signals of at least said second subset of longitudinal sensing portions to provide at least said second zone having a second, different, sensing function.

24. A distributed fiber optic sensor apparatus as claimed in claim 22 wherein the processor is configured to classify the measurement signals based on whether they match one or more predetermined characteristics.

25. A distributed fiber optic sensor apparatus as claimed in claim 24 wherein the predetermined characteristics comprise the characteristics of events of interest.

26. A distributed fiber optic sensor apparatus as claimed in claim 25 wherein the predetermined characteristics further comprise the characteristics of other events, which are not events of interest.

27. A distributed fiber optic sensor apparatus as claimed in claim 22 further comprising a graphical display, wherein the processor is configured to generate a graphical alert on the display when an event of interest is detected.

28. A distributed fiber optic sensor apparatus as claimed in claim 27 wherein the graphical alert comprises an alert being displayed on a representation of the path of the optical fiber at the relevant part of the path.

29. A distributed fiber optic sensor apparatus as claimed in claim 22 wherein the apparatus is adapted such that a user can set one or more zones for the sensor apparatus in use.

30. A distributed fiber optic sensor apparatus as claimed in claim 29 wherein the apparatus is adapted such that a user can select a subset of longitudinal portions of the fiber by selecting a portion of the representation of the path of the optical fiber or a representation of the measurement channels of the optical fiber which are displayed on a graphical display.

31. A distributed fiber optic sensor apparatus as claimed in claim 22 wherein the apparatus is adapted such that a user can select the events to be detected in a chosen zone.

32. A distributed fiber optic sensor apparatus as claimed in claim 22 wherein the optical fiber comprises a first physical arrangement in the first zone and a second physical arrangement, which is different to the first physical arrangement, in the second zone.

33. A distributed fiber optic sensor apparatus as claimed in claim 32 wherein the different physical arrangement in the first and second zones comprises a different fiber geometry in each zone.

34. A distributed fiber optic sensor apparatus as claimed in claim 33 wherein the optical fiber has a first geometry in the first zone which provides a first effective spatial resolution and a second geometry in the second zone which provides a second, different, effective spatial resolution.

35. A computer program for programming a suitable computer to perform the method of claim 1.

36. A method of distributed sensing comprising the steps of:
   interrogating an optical fiber with electromagnetic radiation;
   detecting electromagnetic radiation which is Rayleigh back-scattered from the optical fiber;
   processing said detected back-scattered radiation to provide a measurement signal for each of a plurality of longitudinal sensing portions of the optical fiber; and
   analysing the measurement signals from the longitudinal sensing portions to detect events of interest, wherein the method comprises
   analysing the measurement signals of a first subset of longitudinal sensing portions to provide a first zone having a first sensing function and analysing the measurement signals of at least a second subset of longitudinal sensing portions to provide at least a second zone having a second, different, sensing function, wherein the measurement signals from the first zone are analysed to determine if the measurement signals match a first characteristic or signature of a first event of interest and the measurement signals from the second zone are analyzed to determine if the measurement signals match a second characteristic or signature of a second, different, event of interest.

* * * * *